US012663058B2

(12) United States Patent
Bastiaansen et al.

(10) Patent No.: US 12,663,058 B2
(45) Date of Patent: Jun. 23, 2026

(54) DUAL CLUTCH TRANSMISSION SYSTEM

(71) Applicant: PUNCH POWERTRAIN PSA E-TRANSMISSIONS N.V., Sint-Truiden (BE)

(72) Inventors: Roy Bastiaansen, Sint-Truiden (BE); Rens Obelink, Sint-Truiden (BE); Bert Johannes Cornelis Van Bakel, Sint-Truiden (BE); Chi Wai Chan, Sint-Truiden (BE)

(73) Assignee: PUNCH POWERTRAIN PSA E-TRANSMISSIONS N.V., Sint-Truiden (BE)

( * ) Notice: Subject to any disclaimer, the term of this patent is extended or adjusted under 35 U.S.C. 154(b) by 0 days.

(21) Appl. No.: 18/651,073

(22) Filed: Apr. 30, 2024

(65) Prior Publication Data

US 2024/0280165 A1     Aug. 22, 2024

Related U.S. Application Data

(62) Division of application No. 18/018,243, filed as application No. PCT/EP2021/070204 on Jul. 20, 2021, now Pat. No. 11,994,192.

(30) Foreign Application Priority Data

Jul. 28, 2020   (NL) ..................................... 2026153

(51) Int. Cl.
F16D 25/10        (2006.01)
F16D 21/06        (2006.01)
(Continued)

(52) U.S. Cl.
CPC ............. F16H 3/006 (2013.01); F16D 25/10 (2013.01); F16H 61/688 (2013.01); *F16D 2021/0661* (2013.01); *F16H 2061/0046* (2013.01)

(58) Field of Classification Search
CPC ........... F16D 25/10; F16D 25/082–087; F16D 2025/081; F16D 2048/0251;
(Continued)

(56) References Cited

U.S. PATENT DOCUMENTS 11,994,192 B2 * 5/2024 Bastiaansen ........ F16H 57/0426
2005/0279605 A1 * 12/2005 Sowul ................. F16D 25/0638
192/48.91
(Continued)

FOREIGN PATENT DOCUMENTS

DE         3705052 A1 *   9/1988
DE         10063781 A1    8/2002
(Continued)

OTHER PUBLICATIONS

Search Report and Written Opinion dated Mar. 30, 2021, for Application No. NL2026153 (13 pages).

*Primary Examiner* — Ernesto A Suarez
*Assistant Examiner* — Lillian T Nguyen
(74) *Attorney, Agent, or Firm* — KDW Firm PLLC

(57) ABSTRACT

A dual clutch transmission for a motor vehicle power train for selectively coupling rotating transmission members includes a base assembly, a bearing mounted rotating assembly which is rotatable with respect to the base assembly, first and second torque transmission assemblies movable between disengaged and engaged positions, and first and second actuation mechanisms associated with the first and second torque transmissions assemblies. The actuating mechanisms are arranged for moving the respective torque transmission assemblies between the disengaged and engaged positions for selectively coupling the transmission members. The first torque transmission assembly couples two rotating members in the engaged position. The first actuating mechanism includes a hydraulic actuating mechanism having a piston chamber and a piston for moving the (Continued)

first torque transmission assembly between the disengaged and engaged positions. The piston chamber is arranged in the base assembly, and the piston actuates the first torque transmission assembly in the rotating assembly.

18 Claims, 8 Drawing Sheets

(51) Int. Cl.
    *F16H 3/00*         (2006.01)
    *F16H 61/688*     (2006.01)
    *F16H 61/00*      (2006.01)

(58) Field of Classification Search
    CPC ..... F16D 2048/0254; F16D 2021/0661; F16D 2048/2051
    See application file for complete search history.

(56)           References Cited

U.S. PATENT DOCUMENTS

2011/0079481 A1*   4/2011   Carey  .................. F16D 25/087
                                      192/48.1

2011/0290610 A1*  12/2011  Arnold  .................... F16D 21/06
                                      192/48.1
2018/0051756 A1*   2/2018  Lint  .................... F16D 25/0638
2018/0163791 A1    6/2018  Jeong
2019/0048943 A1    2/2019  Park
2020/0116217 A1    4/2020  Ko
2020/0164733 A1*   5/2020  Hauck  .................. F16D 25/082

FOREIGN PATENT DOCUMENTS

| DE | 102011086712 A1 | | 6/2012 |
|----|-----------------|---|--------|
| DE | 102014205506 A1 | | 10/2014 |
| DE | 102017104458 A1 | | 9/2017 |
| DE | 102018120707 A1 | | 1/2020 |
| DE | 102018009087 A1 | | 5/2020 |
| DE | 102019100970 A1 | * | 7/2020 |
| DE | 102020127724 A1 | | 1/2022 |
| WO | 2018046049 A1 | | 3/2018 |
| WO | 2018192965 A1 | | 10/2018 |
| WO | 2020127370 A1 | | 6/2020 |
| WO | 2021099070 A1 | | 5/2021 |

* cited by examiner

DUAL CLUTCH TRANSMISSION SYSTEM

CROSS-REFERENCE TO RELATED APPLICATIONS

This is a divisional of pending U.S. nonprovisional patent application Ser. No. 18/018,243, filed Jan. 26, 2023, which is a national stage filing under 35 U.S.C. 371 of International Application No. PCT/EP2021/070204, filed Jul. 20, 2021, which claims priority to Netherlands Patent Application No. 2026153, filed Jul. 28, 2020, the entirety of which applications are incorporated by reference herein.

FIELD OF THE DISCLOSURE

The present invention relates to a dual clutch transmission system arranged to be installed in a power train of a motor vehicle, in particular for selectively coupling rotating transmission members.

BACKGROUND

Dual clutch transmission (DCT) systems are as such known and are used to couple, in a torque transmitting manner, rotating transmissions members such as shafts and/or gears. For instance, in a hybrid car, a dual clutch transmission system is used to selectively couple a combustion engine and an electric motor to the power train of the vehicle. A conventional dual clutch transmission system arranged to be installed in a power train of a motor vehicle for selectively coupling rotating transmission members typically comprises: a base assembly; a bearing mounted rotating assembly which is rotatable with respect to the base assembly; first and second torque transmission assemblies being movable between disengaged and engaged positions; first and second actuation mechanisms associated with the first and second torque transmissions assemblies, wherein the actuating mechanisms are arranged for moving the respective torque transmission assemblies between the disengaged and engaged positions for selectively coupling the transmission members.

It is a goal, next to other goals, to provide a dual clutch transmission system which is more compact. Additionally, it is a goal to provide a dual clutch transmission system which is more efficient. Generally, it is a goal to provide an improved dual clutch transmission system.

SUMMARY

At least one of these goals, amongst other goals, is met by a dual clutch transmission system according to appended claim 1. More specifically, this goal, amongst other goals, is met by a dual clutch transmission system arranged to be installed in a power train of a motor vehicle, preferably for selectively coupling rotating transmission members, wherein the transmission system comprises:
   a base assembly;
   a bearing mounted rotating assembly which is rotatable with respect to the base assembly;
   first and second torque transmission assemblies being movable between disengaged and engaged positions;
   first and second actuation mechanisms associated with the first and second torque transmissions assemblies, wherein the actuating mechanisms are arranged for moving the respective torque transmission assemblies between the disengaged and engaged positions, for instance for selectively coupling the transmission members.

Preferably, at least the first torque transmission assembly is arranged in the rotating assembly and is more preferably arranged to couple two rotating members in the engaged position. The first torque transmission assembly may for instance couple the rotating assembly to an output shaft which is input to a gear box. Also the rotating assembly may be coupled to an output shaft. The two output shafts may be arranged at least partially coaxially.

For actuating the first torque transmission assembly, preferably at least the first actuating mechanism comprises a hydraulic actuating mechanism comprising a piston chamber and a piston for moving the first torque transmission assembly between the disengaged and engaged positions.

According to a first aspect, the piston chamber, and preferably the piston, of the first actuating mechanism is arranged in the base assembly, wherein the piston is arranged to actuate the first torque transmission assembly in the rotating assembly. By providing the piston chamber or piston cavity in the base assembly, i.e. in a static or non-rotating environment, changes in pressures in the piston chamber due to the centrifugal forces are prevented. Accidental actuation of the piston is thus prevented, without the need to provide a compensation chamber as in known in the art. A more compact and more cost efficient configuration is thus obtained.

Generally, by providing at least a part of the actuating mechanism for a torque transmission assembly which is arranged in a rotating assembly, in the base assembly, a compensation chamber for compensating hydraulic pressure build up due to centrifugal forces is then no longer required.

At least one of the torque transmission assemblies can include a clutch, such as a multiple-disc clutch, preferably comprising a first set of discs and a second set of discs, each connected to a respective carrier. The actuating mechanism may then be arranged to force the discs together such that the discs engage and transfer torque. Both parts of the torque transmission assembly, at least in the engaged position thereof, will thus rotate. It is then preferred if an actuation mechanism, for instance an actuating plate as will be described in greater detail below, also rotates.

The assemblies can be mounted on a shaft (such as the input shaft) of a change-speed transmission (e.g., a continuously variable transmission) in a power train. The second assembly can be disposed at a first radial distance from the axis of such shaft and the first assembly can be constructed, dimensioned and mounted in such a way that it surrounds the first assembly at a greater second radial distance from the axis of the shaft.

The dual clutch transmission system may for instance be installed in a powertrain of a vehicle provided with a combustion engine and an electric motor. The dual clutch transmission system may then be arranged to selectively couple the combustion engine and the electric motor to a load, for instance via a gear box system. Such a gear box may for instance comprise a first and second input shafts, which may be coaxially arranged. The dual clutch transmission system may be arranged around the coaxial shafts and an input shaft, for instance coupled to an engine. A suitable configuration of such a transmission system is disclosed in WO 2018/192965, in particular the embodiment of FIG. 15, the contents of which are herewith incorporated by reference.

For transferring the actuating force to the actuating mechanism, it is then preferred if the system further comprises a ball or thrust bearing between the base assembly and the rotating assembly, wherein the piston of the first actuating mechanism is arranged to engage one the of races of the ball bearing. The other race may then for instance be coupled to an actuating member, which may then rotate together with the torque transmission assembly.

Preferably, the actuating mechanism comprises a biasing mechanism for biasing the first torque transmission assembly towards the disengaged position. The torque transmission assembly thus needs to be actively moved to the engaged position, in particular by increasing the pressure in the piston chamber. The biasing mechanism preferably comprises a spring member.

Preferably, the actuating mechanism comprises an actuating member which is movable in the rotating assembly towards and from the torque transmission assembly for movement between the disengaged and engaged positions. Preferably, the biasing mechanism is arranged between the actuating member and a body of the rotating assembly.

Preferably, in the disengaged position, the actuating member abuts the body of the rotating assembly. Movement of the actuating member for moving the torque transmission assembly between the engaged and disengaged positions is in the disengaged position then limited by the body of the rotating assembly. Instead of directing the forces through for instance the bearing and/or the piston, the actuating member abuts the body of the rotating assembly in the disengaged and resting position, thereby shortening the tolerance loop.

Preferably, the actuating member comprises a radially extending actuating plate and preferably at least one actuating finger extending substantially perpendicular from the actuating plate. The finger allows efficient actuation by moving the finger in the axial direction, seen parallel to the shaft. A compact configuration is obtained if the biasing member is coupled to the actuating finger.

According to a further aspect, the rotating assembly comprises a ring gear body, in particular for coupling to an electric motor, wherein the actuating mechanism is at least partly located inside the ring gear body. The ring gear body is ring shaped, such that components, such as the actuating mechanism can be arranged coaxially inside the ring gear body. A compact configuration is thus obtained.

Preferably, the ring gear body, seen in the rotating context of the rotating assembly, remains stationary. As such, it is preferred if the actuation member, preferably the actuation plate as mentioned above, abuts the ring gear body in the disengaged position.

A further compact configuration is obtained if the biasing mechanism, for instance a spring member, is arranged between ring gear body and the actuating finger.

Preferably, the ring gear body is coupled to the first torque transmission assembly, in particular one of the supporting members or carriers thereof. The ring gear body then rotates in unison with a part of the first torque transmission assembly.

A compact configuration while still allowing an efficient actuation of the torque transmission assembly is obtained if the actuating plate is located axially with respect to the ring gear body. Seen along the axis of the shaft, the actuating plate of the actuation member then extends at an axial distance from the ring member. As the actuation plate is not contained coaxially inside the ring gear body, the actuating plate preferably has a diameter which is larger than at least the inner diameter of the ring gear body, preferably also larger than the diameter of the outer diameter of the ring gear body. The actuating plate thus preferably protrudes in the radial direction form the ring gear body, wherein the actuating finger extends inside the ring gear body.

Preferably, the ring gear body has a U-shaped cross-section, wherein at least part of the actuating mechanism is located between the legs of the U-shaped body. This improves the rigidity of the ring gear body, while still allowing the compact configuration.

When an actuation member with preferably a plurality of fingers and an actuation plate as mentioned above is used, it is preferred if the base of the U-shaped body of the ring gear body is provided with at least one opening receiving the actuating finger.

It is noted that the configuration of the ring gear body and/or the actuation member in the form of the actuation plate with fingers and the interaction of these two components can also be applied in other clutch transmission systems, for instance a single clutch system or a conventional dual clutch transmission system, for instance having the piston chamber in the rotating assembly or other types of actuation mechanisms.

As mentioned above, it is preferred if the piston is arranged to transfer the actuating force via a thrust bearing. However, in order to ensure that the bearing is operating correctly and to reduce any wear, it is preferred if the thrust bearing is maintained under pressure, for instance by applying sufficient force on the ball races.

Thus, according to a further aspect, the system further comprising a hydraulic pump, wherein the pump is arranged to maintain a predetermined non-zero hydraulic pressure in the piston chamber of the base assembly, also in the disengaged position of the torque transmission assembly. Instead of a pump, the system may comprise a suitable controller to control the pressure in the piston chamber. By providing a non-zero pressure in the piston chamber, the bearing coupled to the piston is preloaded. The pressure in the piston chamber in the disengaged position is preferably not sufficient to overcome the biasing force of the biasing mechanism.

Preferably, the pump, or any controller, is arranged to apply a non-zero pressure in the piston chamber when the torque transmission assembly is in the disengaged position and wherein the pump is arranged to increase said pressure for moving the torque transmission assembly to the engaged position.

In particular when the piston chamber is kept under constant pressure, although not limited to this situation, it is preferred if any leaking hydraulic fluid, typically a lubricant, is used for lubricating components in the system. Typically, a piston chamber is provided with a de-airing channel. According to a further aspect, the system comprises a lubricating channel system arranged for lubricating components, in particular at least one bearing, of said clutch transmission system, wherein the piston chamber of the first actuating mechanism comprises a channel, for instance a clutch de-airing channel, connected to the lubricating channel system. Instead of collecting the leaking oil in the sump, the oil can be collected for supplying lubricant from the piston chamber to the lubricating channel system. This improves the size and efficiency of the system, in particular oil consumption. It will be appreciated that this configuration may also be applied in conventional clutch transmission systems or other components having a piston chamber and a lubricating system.

According to a further aspect, a connecting bolt extends in the piston chamber of the actuating mechanism. By providing a piston chamber in the base assembly, this space can be used as receptacle for a bolt. The head of the bolt may thus form an end wall of the piston chamber. An additional receptacle for a bolt is then not required, such that a more compact configuration is obtained.

Preferably, the connecting bolt extends through a body of the base assembly for locking a further component to said body. More preferably, the connecting body connects to a locking plate for coupling a bearing mechanism to the body.

It will be appreciated that although in particular the first torque transmission assembly and the associated mechanisms are described above, the same features may be applied to the second torque transmission assembly.

Thus, according to a further aspect, a dual clutch transmission system is provided, wherein also the second torque transmission assembly is arranged in the rotating assembly. The second torque transmission assembly may be arranged to couple two rotating members in the engaged position. Also the second actuating mechanism may comprise a hydraulic actuating mechanism comprising a piston chamber and a piston for moving the second torque transmission assembly between the disengaged and engaged positions. Also here, the second actuating mechanism preferably comprises a biasing mechanism having a biasing force for biasing the second torque transmission assembly towards the disengaged position. Actuating the actuating mechanism, for instance by increasing the hydraulic pressure in the piston chamber, will thus result in moving the second torque transmission assembly towards the engaged position, whereas lowering the pressure will automatically result in disengagement of the torque transmission assembly.

The piston chamber of the second actuating mechanism is however arranged preferably arranged in the rotating assembly. Providing a piston chamber is the rotating assembly however has the drawback that the pressure in the piston chamber varies dependent on the rotational speed of the rotating assembly due to the centrifugal forces. In order to counter this accidental opening of the second torque transmission assembly, a compensation chamber is typically arranged at the opposite side of the piston for countering said increasing pressure proportionally. Such a compensation chamber however adds mass to and takes space in the rotating assembly, while it also adds costs due to additional components. Preferably, the second torque transmission assembly, or at least the actuating mechanism thereof, is located radially inwardly with respect to the first torque transmission assembly.

Therefore, according to a further aspect, the system further comprises a controller for controlling the rotational speed of the rotating assembly, wherein the controller is arranged to limit the rotational speed of rotating assembly on the basis of the biasing force of the biasing mechanism. A relatively light, i.e. having a relatively small biasing force, biasing mechanism can thus be used. Preferably, the biasing mechanism is arranged to maintain the torque transmission assembly in the disengaged position up to a predetermined rotational speed of the rotating assembly, wherein preferably a higher rotational speed would move the torque transmission assembly to the engaged position. The biasing member, for instance a spring, thus typically has a sufficiently large biasing force to counter the additional centrifugal forces up to this predetermined rotational speed. In theory, rotating the rotating assembly at higher speeds than the predetermined rotational speed may then result in moving the second torque transmission assembly towards the engaged position. However, the controller is arranged to limit the rotational speed to or preferably below the predetermined rotational speed.

As an example, the rotational speed of the rotating assembly may be limited to 4000 RPM, preferably, 3500 RPM, more preferably 3000 RPM.

As such, the rotating assembly preferably has no pressure compensation chamber associated with the piston chamber of the second actuating mechanism.

Preferably, the rotating assembly comprises a transmission coupled to an electric motor. The rotating assembly may for instance comprises a gear, for instance the ring gear body as mentioned above, for coupling to an electric motor. The controller is then preferably arranged to limit the rotational speed of the electric motor on the basis of the biasing force of the biasing mechanism.

Preferably, the second torque transmission assembly is arranged to couple between the rotating assembly and an input shaft coupled to a combustion engine. In particular when a vehicle is operating in electric mode, i.e. driven by only the electric motor, coupling to the combustion engine is to be prevented.

It will be appreciated that although the above is described in the context of a dual clutch transmission system having only two torque transmission assemblies, the same teachings may be applied to a single clutch system having only one torque transmission assembly, which is preferably arranged in a rotating assembly. Similarity, additional, i.e. more than two, torque transmission assemblies may be provided.

BRIEF DESCRIPTION OF THE DRAWINGS

The present invention is further illustrated by the following Figures, which show a preferred embodiment of the system according to the invention, and are not intended to limit the scope of the invention in any way, wherein.

DETAILED DESCRIPTION

Figure 1A:
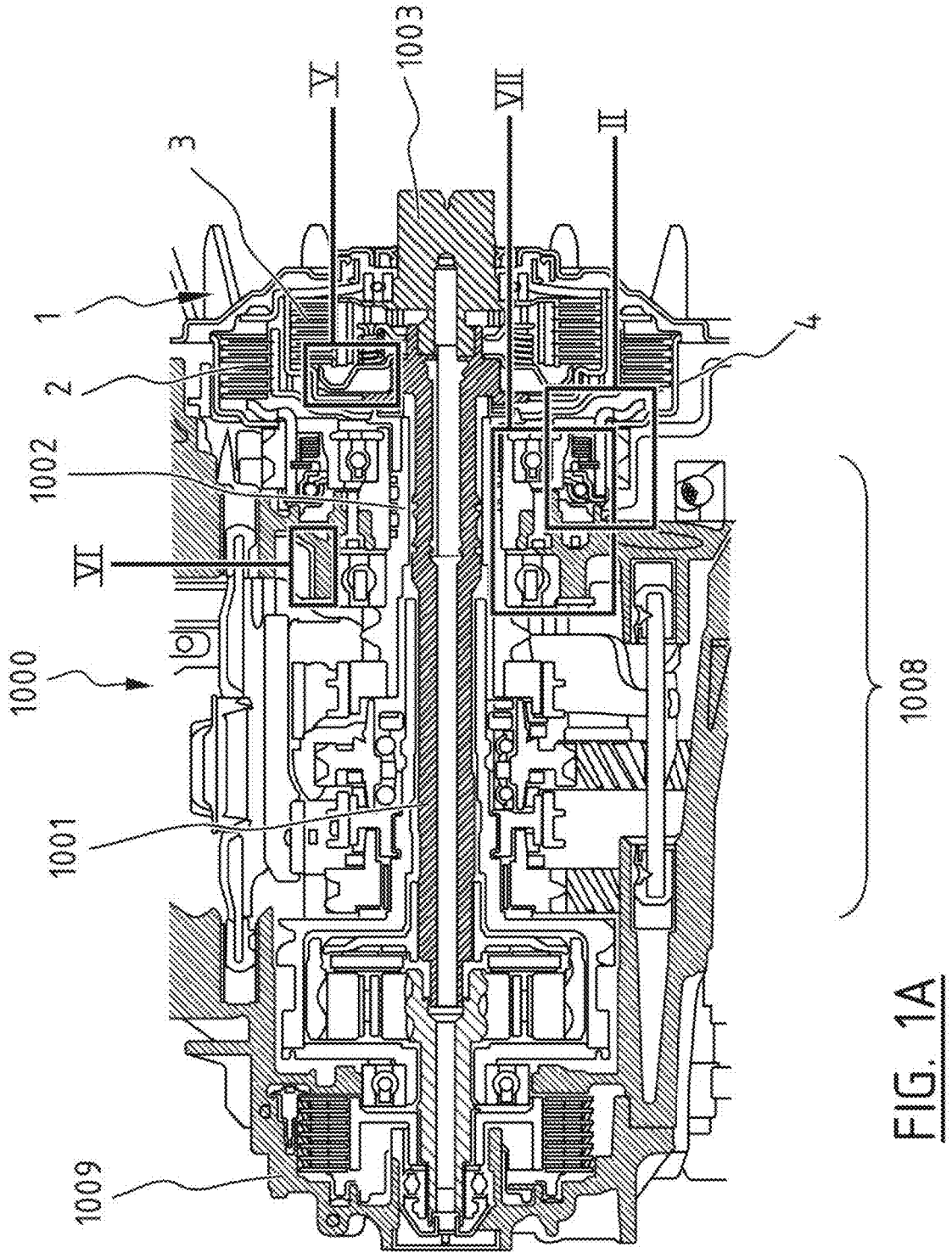
FIGS. 1a, b schematically show a dual clutch transmission system in a transmission system in cross-section, respectively schematic representation.

In FIGS. 1a and b, a transmission system 1000 is shown which is arranged to be installed in a vehicle such as a car. The configuration corresponds to the embodiment of FIG. 15 of WO 2018/192965, the contents of which are herewith incorporated by reference. In short, the system 1000 comprises an input axis 1003 coupled to a combustion engine M, a first shaft 1001 and a second shaft 1002 coaxially arranged around the first shaft 1001. Provided on a first end is a dual clutch system 1, which is arranged to selectively couple the shafts 1003, 1001 and 1002 via torque transmissions assemblies 2 and 3. An electric motor EM is coupled to a rotating assembly 4 of the dual clutch transmission system 1. At the other end of the system 1000, a second clutch system 1009 is provided, in between which a gear transmission system 1008 is provided for driving a load L.

As is better visible in FIG. 1*a*, the first torque transmission assembly 2 is positioned radially outwardly with respect to the second torque transmission assembly 3, as seen with respect to an axis A coinciding with the shafts 1003, 1001, 1002. Also with reference to FIGS. 2*a* and *b*, the first torque transmission assembly 2 comprises a plurality of first plates 21 which are coupled to a carrier 24 which forms a part or is otherwise coupled to the rotating assembly 4 of the dual clutch transmission system 1. Second plates 22 are positioned between the first plates 21 and are carried by carrier 23. In this example, carrier 23 is coupled to the second shaft 1002, such that in the engaged position (see FIG. 2*b*) of the first torque transmission assembly 2 shaft 1002 is coupled to the rotating assembly 4. In this position, rotating assembly 4 and shaft 1002 rotate in unison. The rotating assembly 4 rotates with respect to a base assembly, as will be described later, around axis A.

The second torque transmission assembly 3 has a similar configuration and couples, in this example, rotating assembly 4 to the input shaft 1003. Shaft 1001 is in this example fixedly coupled to rotating assembly 4 and thus rotates together with the shaft 1001.

For moving the first torque transmission system 2 between the disengaged (FIG. 2*a*) and the engaged position (FIG. 2*b*), an actuating mechanism generally indicated with 5 is provided. The mechanism 5 comprises an actuating member formed of an actuation plate 51 which is arranged to be moved towards (arrow 100) and from (arrow 101) the torque transmission assembly 2 along the axial direction A. By moving the plate 51 towards the assembly 2, the plates 21, 22 of the clutch assembly 2 are moved together in frictional relation and will thus couple. Movement in the other direction (arrow 101) will again separate the plates 21, 22, thereby disengaging the clutch assembly 2.

Figure 1B:
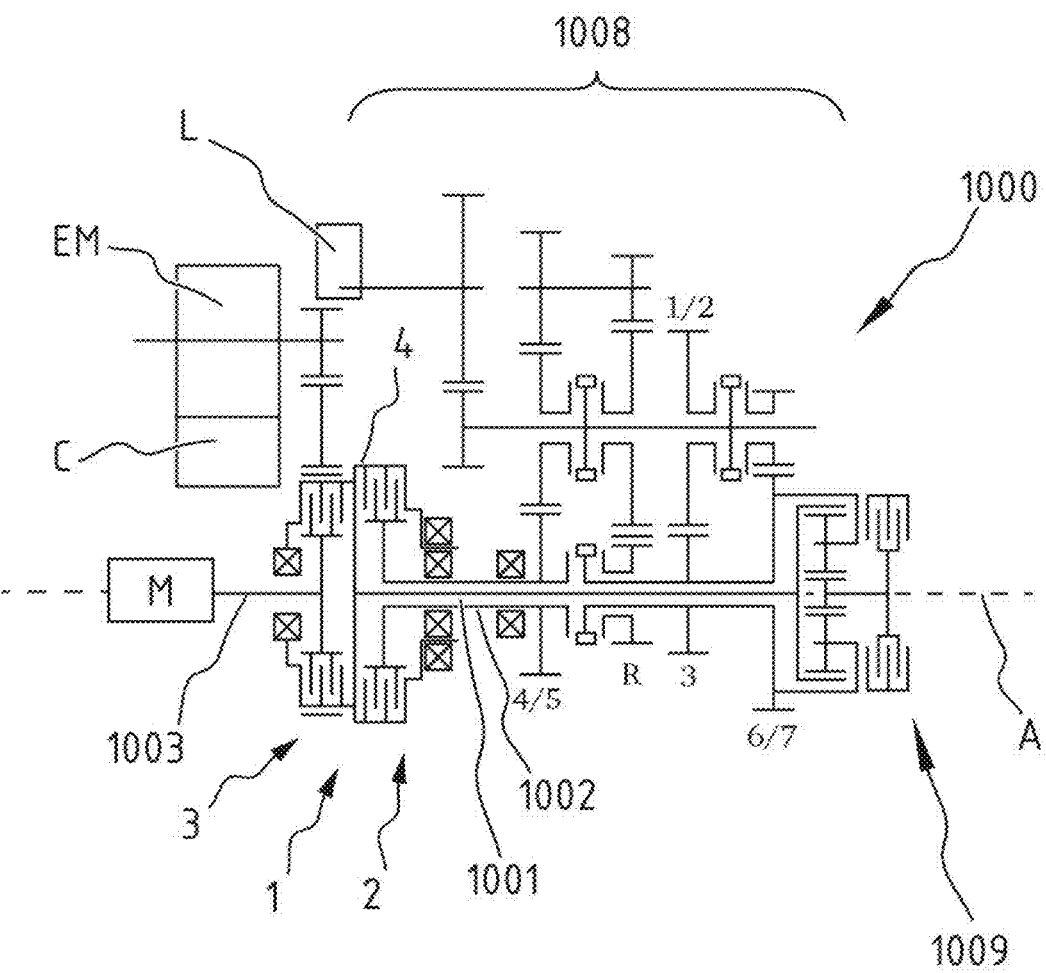
Figure 3:
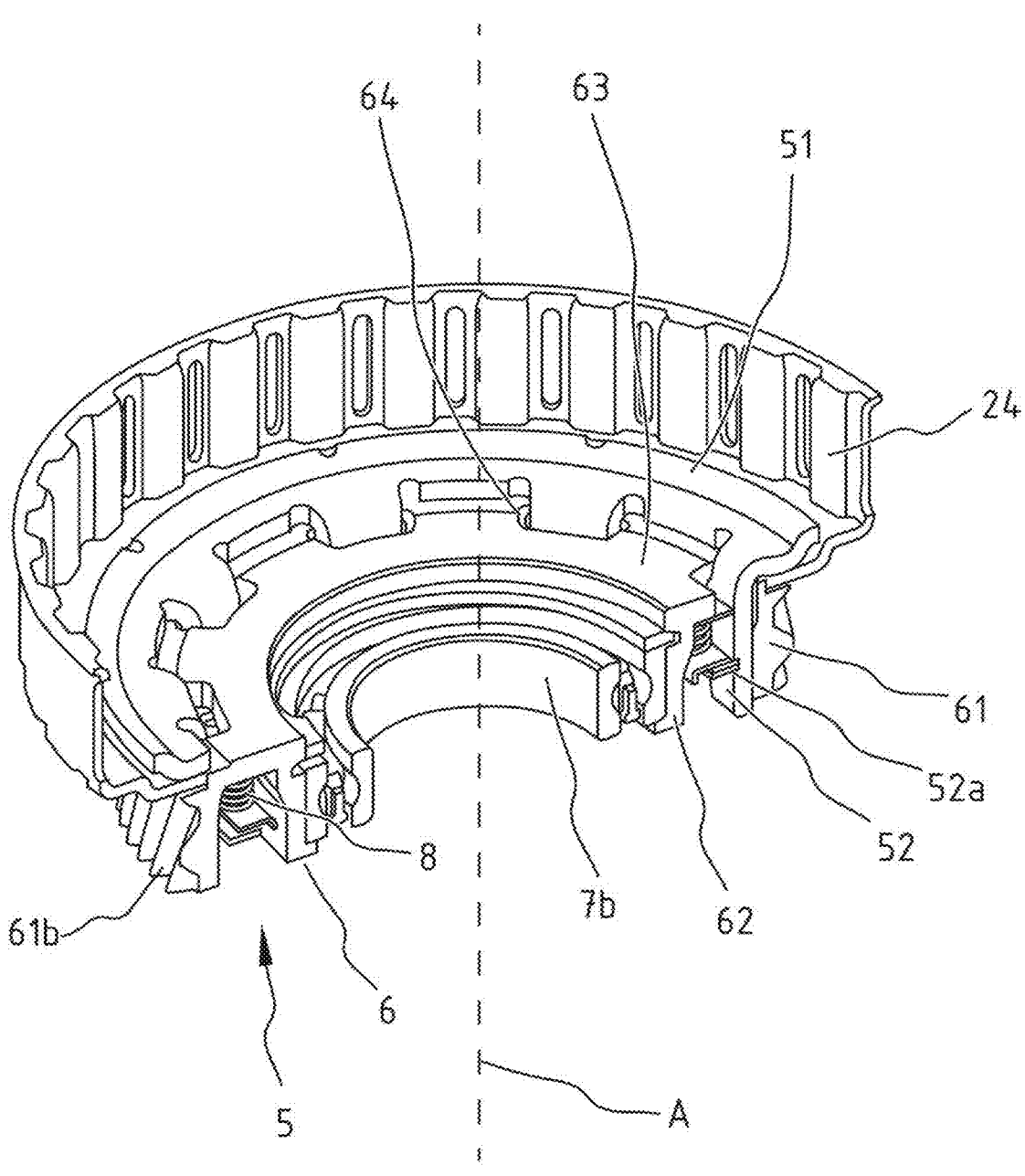
FIG. 3 show a ring gear body with actuation member.

Coupled to the radially extending actuation plate 51 are axially (seen along axis A, see also FIG. 3) actuation fingers 52. Actuation fingers 52 extend perpendicularly with respect to the actuation plate 51. In FIG. 3, also a ring gear body 6 is clearly visible. Gearing 61*b* provided on an outer surface is arranged to couple to the electric motor EM (see FIG. 1). The gear 6 is ring shaped, wherein components can be provided coaxially inside the ring, for instance a part of the actuating mechanism, for instance the actuation fingers 52.

The ring body 6 has a substantially U-shaped cross-section having two side walls 61 and 62 and a base 63. At least a part of the actuating mechanism 5 is provided between the legs of the U-shape. The base 63 of the U-shape is provided with openings 64 to allow the fingers 52 to pass.

The actuation mechanism 5 is biased towards the disengaged position (FIG. 2*a*), to which end a biasing mechanism 8 in the form of a plurality of springs 8 is provided. Also the springs 8 are provided inside the gear ring body 6, in particular inside the U-shape thereof.

Figure 2:
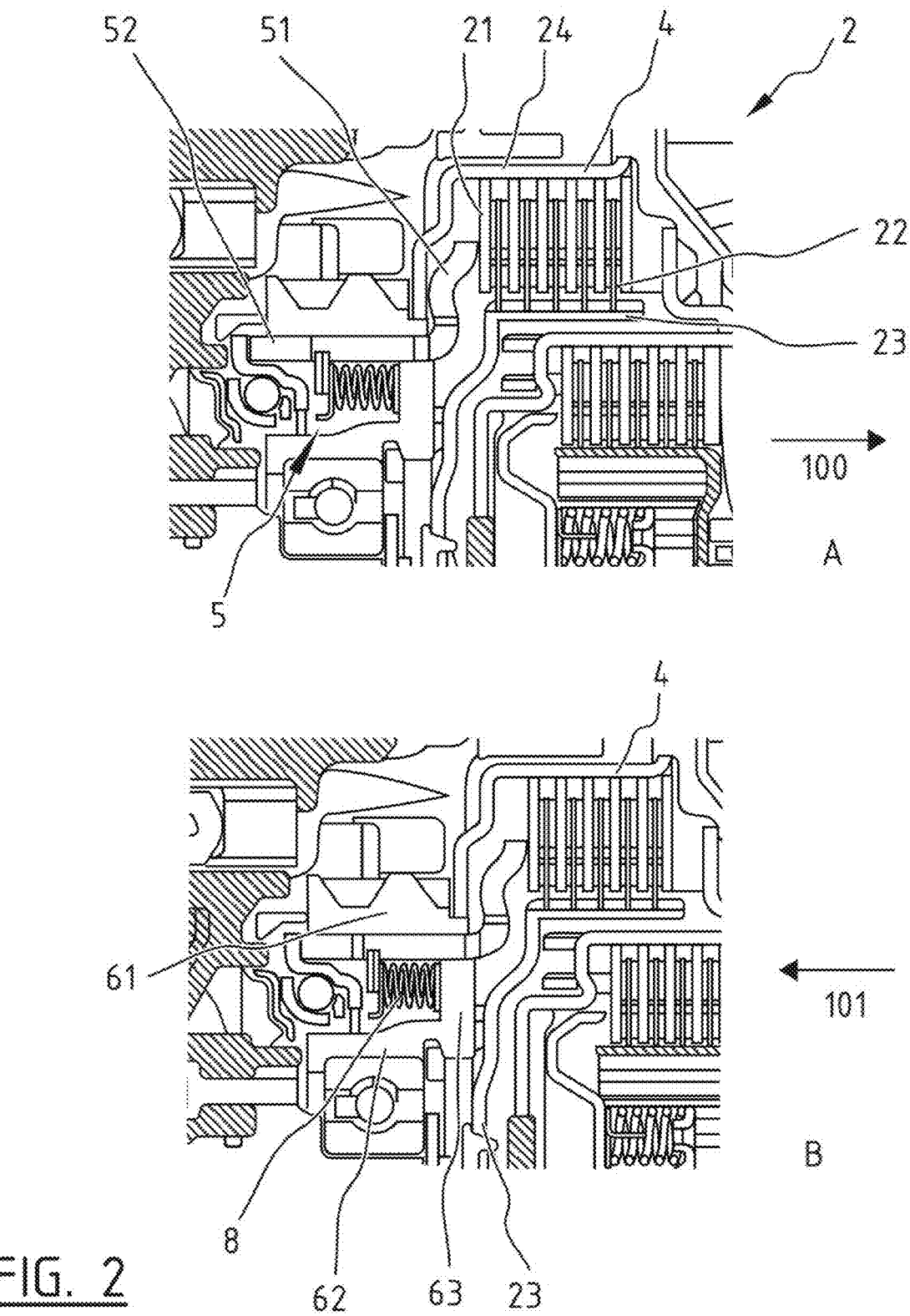
FIGS. 2a and b show a detail II in FIG. 1 and show the first torque transmission assembly in disengaged and engaged position, respectively.
Figure 4:
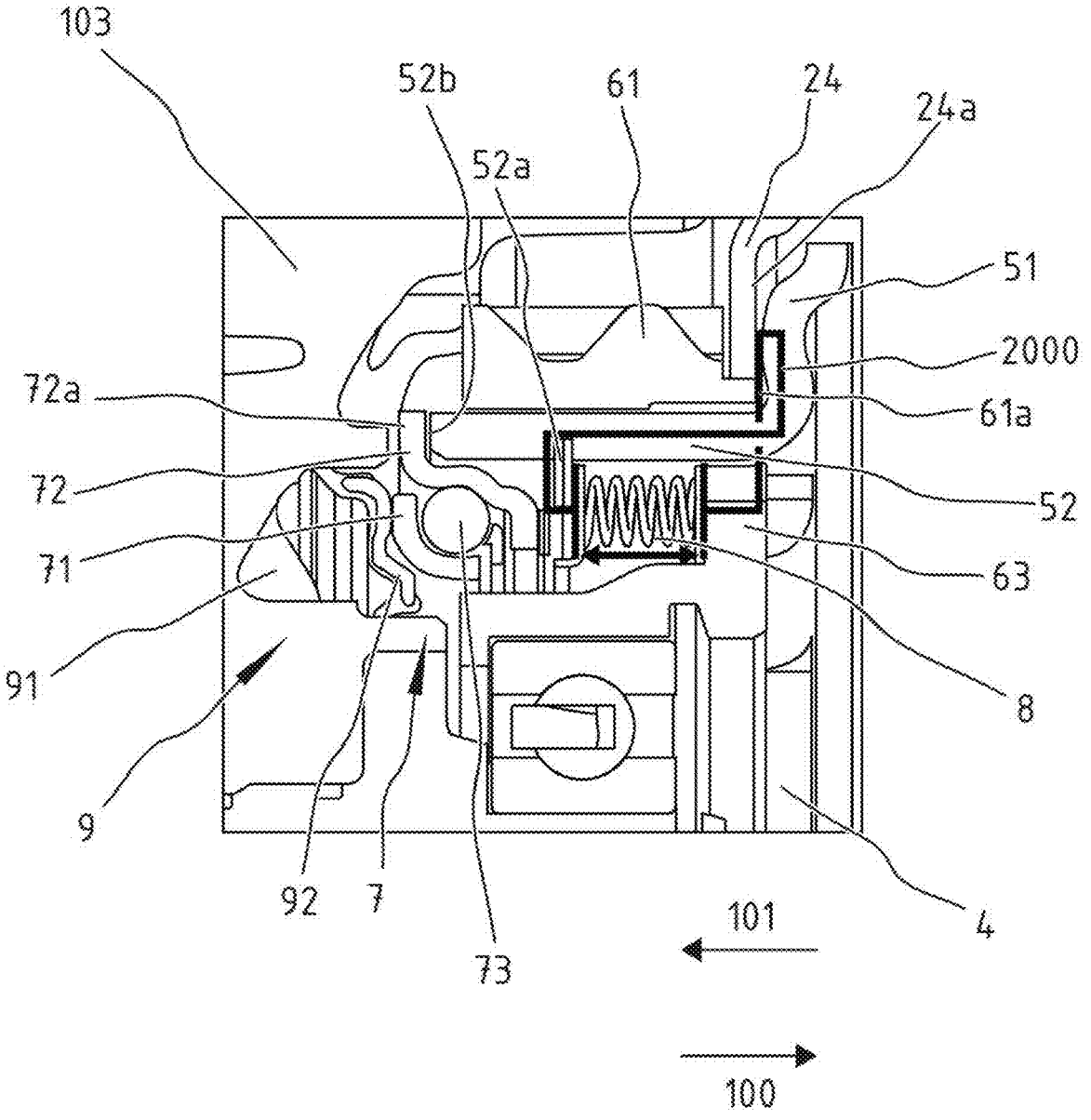
FIG. 4 shows a detail of the actuating mechanism of the first torque transmission mechanism.

With further reference to FIG. 4, it can be seen that a spring 8 at a first end abuts the gear ring body 6, in particular the base 63 thereof, while the other end engages the actuation mechanism, in this example an actuation finger 52 which is thereto provided, in this example, with a protrusion 52*a*. Spring 8 urges the actuation finger 52 in the direction 101, i.e. to the disengaged position as shown in FIG. 2*a*.

Movement in the direction 101 is limited by the actuation member, in this example the plate 51 abutting the rotating assembly 4, in this example an end surface 61*a* of the ring 6 or a radial surface 24*a* of the carrier 24 which is part of the rotating assembly 4. The tolerance loop 2000 is thus relatively short.

In FIG. 4, the parts which are rotating and thus are part of the rotating assembly 4 and the parts which remain stationary, hereafter the base assembly 103 are provided with different hashing. It will be appreciated that a piston chamber 91 of the piston pump 9 which is arranged to move a piston 92 which in the end moves the actuating mechanism 5 is not located in the rotating assembly 4. Instead, the piston chamber 91 is located in the base assembly 103. It will be appreciated that due to this configuration, no pressure compensation chamber is required.

A bearing 7, provided with two races 71 and 72 between which balls 73 are contained, is used to transfer the force from the piston 92 when moved in the direction 100 to the actuation fingers 52. Race 72, part of the rotating assembly 4, actuates the actuation finger 52 and is thereto preferably provided with a flange 72*a* which abuts the end face 52*b* of the actuation finger 52. In order to ensure proper functioning of the bearing 7, the piston 92 will exert a constant pressure on the bearing 7, also in the disengaged position of the torque transmission assembly 2. A pump or a controller (generally indicated with C in FIG. 1) may be arranged to this end.

Figure 5:
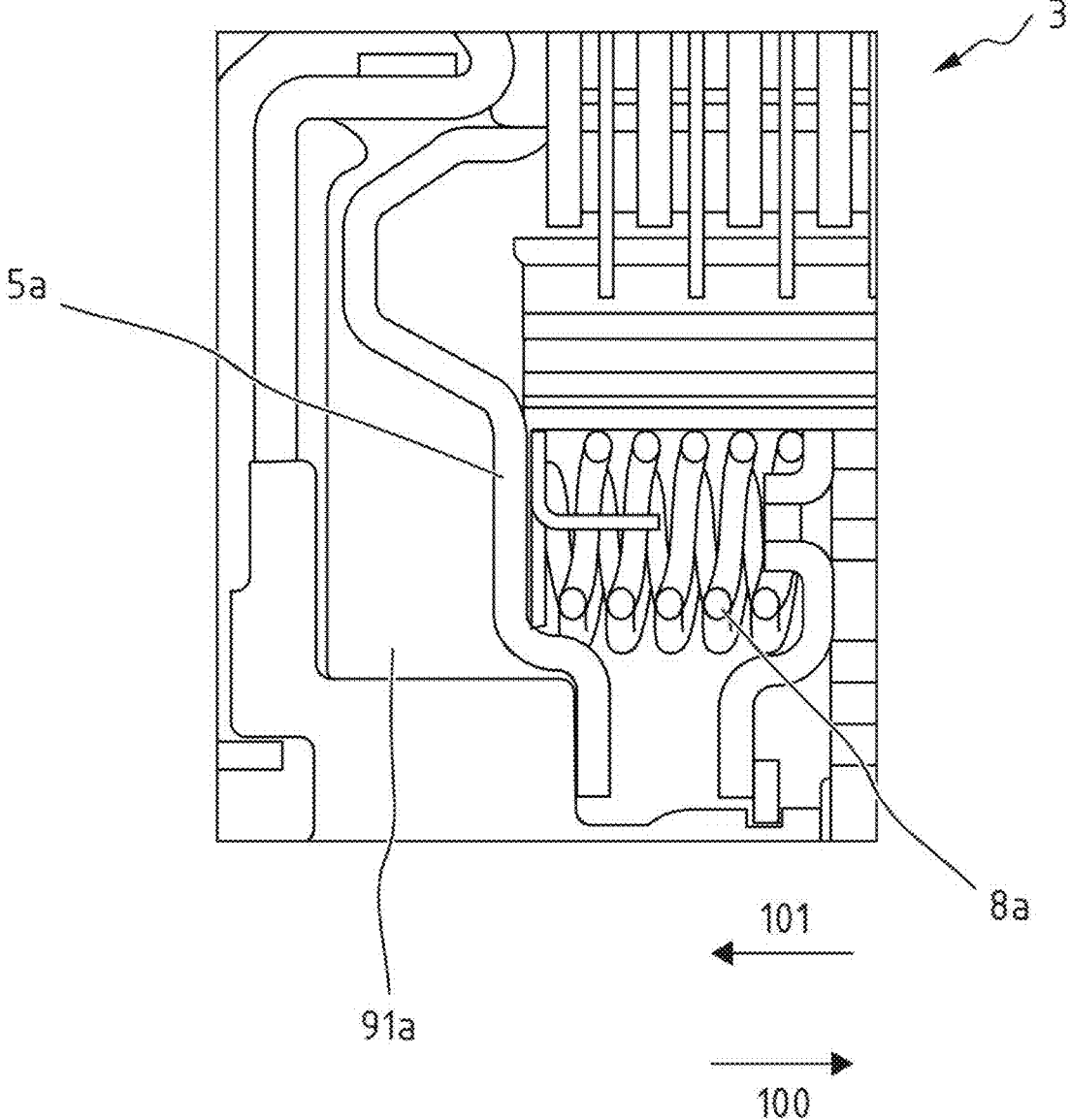
FIG. 5 shows a detail V of FIG. 1 and show shows the second actuating mechanism of the second torque transmission assembly.

Also in the actuation mechanism 5*a* of the second torque transmission assembly 3 (see FIG. 5) no compensation chamber is required, although the piston chamber 91*a* for effecting movement of the actuation member 5*a* is located in the rotating assembly 4. In this example, a relatively weak spring 8*a* is provided which biases actuation member 5*a* in the direction 101, i.e. towards the disengaged position. In theory, it may however happen that due to increasing rotational speed, the centrifugal forces urge more oil into the chamber 91*a*, thereby moving the actuation member 5*a* in the direction 100, thereby engaging the second clutch assembly 3. Instead of providing a compensation chamber or increasing the biasing force of the spring 8*a*, a controller C (see FIG. 1) is arranged to limit the rotational speed of the electric motor EM such that the pressure in the piston chamber 91*a* does not exceed the biasing force of the spring member 8*a*.

Figure 6:
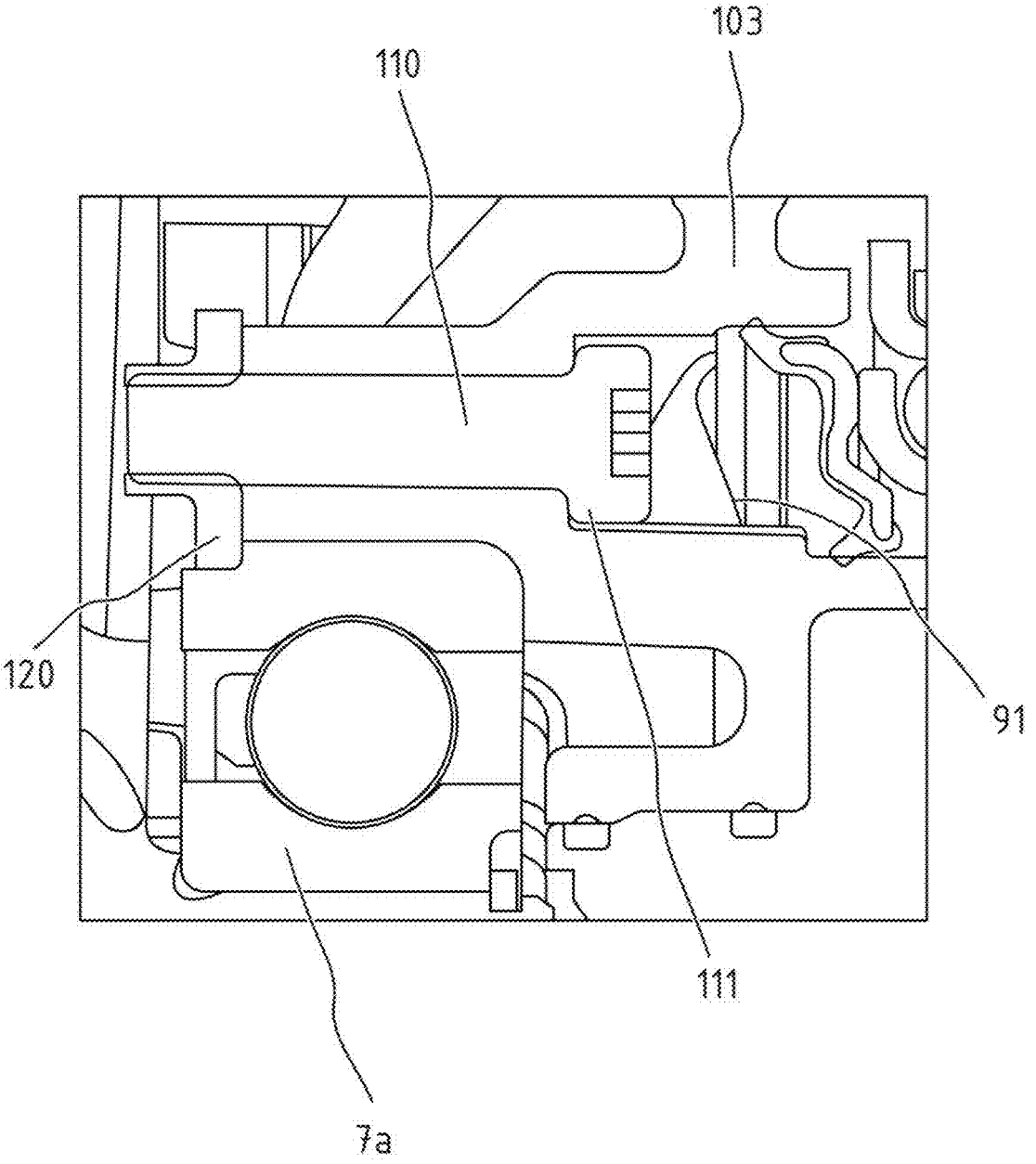
FIG. 6 shows a detail VI from FIG. 1.

In FIG. 6, it can be seen that the piston chamber 91 in the base assembly 103 is used to receive the head 111 of a bolt 110 for connecting a locking plate 120 which locks a bearing 7*a*. The head 111 of the bolt 110 hereby forms a part of the end wall of the piston chamber 91 and preferably seals of the chamber. A separate connection mechanism for such a bolt 110 is thus not required, which thus provides a more compact configuration. Although the bolt 110 is here seen to connect a bearing 7*a*, it will be appreciated that also other components may be coupled using a bolt provided in a piston chamber 91.

Figures 7, 8:
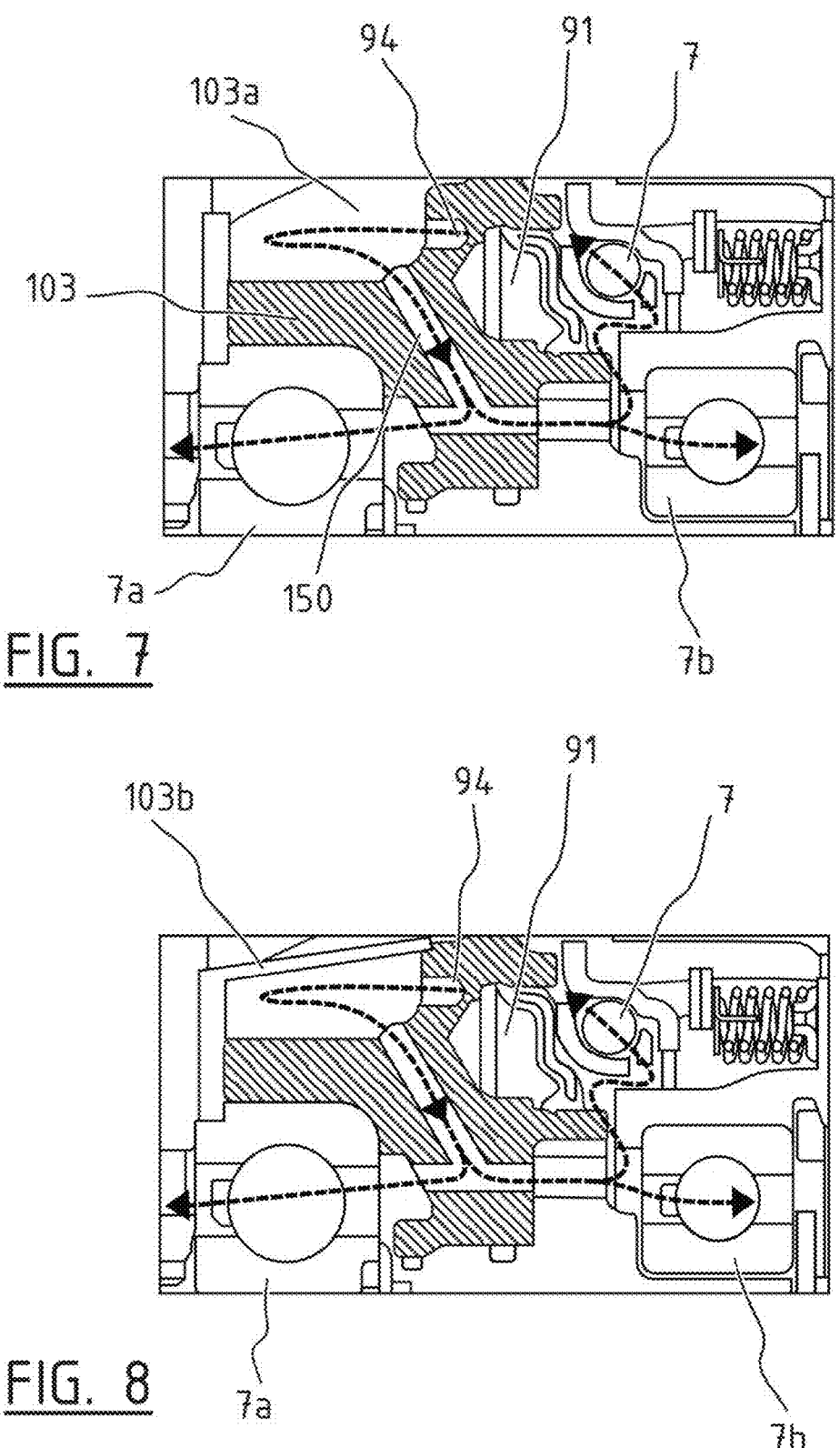
FIG. 7 shows a detail VII from FIG. 1.
FIG. 8 shows an alternative to the configuration of FIG. 7.

In FIGS. 7*a* and *b*, it can be seen that the piston chamber 91 comprises a channel 94 extending in a receptacle 103*a* in the base assembly 103. Such a channel 94 may be used to de-air the piston chamber 91. However, in particular when applying a constant hydraulic pressure in the piston chamber 91 to pre-load the bearing, see above, hydraulic oil will leak through the channel 94. Instead of directing this oil to the sump, the oil is collected in the receptacle 103*a* and the receptacle 103*a* is coupled to a lubrication channel system 150. In this example, this system 150 is used to lubricate bearings 7, 7*a*,*b*. Hydraulic oil from the piston chamber 91 can thus be re-used to lubricate other components of the system 1.

In order to ensure efficient guidance of the oil from the piston chamber 91 to the channel system 150, a closed container 103*b* is preferably formed. Despite increasing centrifugal forces, the oil is then directed towards the channel system 150.

The present invention is not limited to the embodiment shown, but extends also to other embodiments falling within the scope of the appended claims.

What is claimed is:

1. A dual clutch transmission system arranged to be installed in a power train of a motor vehicle for selectively coupling rotating transmission members, the transmission system comprising:

a base assembly;

a rotating assembly which is bearing mounted and rotatable with respect to the base assembly;

first and second torque transmission assemblies being movable between disengaged and engaged positions;

first and second actuation mechanisms associated with the first and second torque transmissions assemblies, wherein the actuation mechanisms are arranged for moving the respective torque transmission assemblies between the disengaged and engaged positions for selectively coupling the transmission members, wherein the first torque transmission assembly is arranged in the rotating assembly and is arranged to couple two rotating members in the engaged position and wherein at least the first actuation mechanism comprises a hydraulic actuation mechanism comprising a piston chamber and a piston for moving the first torque transmission assembly between the disengaged and engaged positions, wherein the piston chamber of the first actuation mechanism is arranged in the base assembly, wherein the piston is arranged to actuate the first torque transmission assembly in the rotating assembly, wherein the first actuation mechanism comprises a biasing mechanism for biasing the first torque transmission assembly towards the disengaged position, wherein the first actuation mechanism comprises an actuating member which is axially movable to move the first torque transmission assembly between the disengaged and engaged positions, and wherein the biasing mechanism is arranged between the actuating member and a body of the rotating assembly, wherein the actuating member comprises a radially extending actuating plate and at least one actuating finger extending perpendicular from the actuating plate and parallel to an input axis of the system, wherein the actuating finger includes a protrusion disposed in a central portion thereof, and an end face;

wherein the protrusion directly engages the biasing member to couple the actuating finger to the biasing member, and the end face engages a race of the rotating assembly; and wherein the transmission system further comprises a lubricating channel system for lubricating at least one bearing of said dual clutch transmission system, wherein the piston chamber of the first actuation mechanism comprises a channel connected to the lubricating channel system for supplying lubricant from the piston chamber to the lubricating channel system.

2. The dual clutch transmission system according to claim 1, wherein the rotating assembly is rotatable with respect to the base assembly via a ball bearing disposed between the base assembly and the rotating assembly, wherein ball bearing includes the race, and wherein the piston of the first actuation mechanism is arranged to engage the race.

3. The dual clutch transmission system according to claim 1, wherein in the disengaged position, the actuating member abuts the body of the rotating assembly.

4. The dual clutch transmission system according to claim 3, wherein the rotating assembly comprises a ring gear body, wherein the first actuation mechanism is at least partly located inside the ring gear body, and wherein the actuation plate abuts the ring gear body in the disengaged position.

5. The dual clutch transmission system according to claim 1, wherein the rotating assembly comprises a ring gear body, wherein the first actuation mechanism is at least partly located inside the ring gear body.

6. The dual clutch transmission system according to claim 5, wherein the ring gear body is coupled to the first torque transmission assembly.

7. The dual clutch transmission system according to claim 5, wherein the ring gear body has a U-shaped cross-section, and wherein at least part of the first actuating mechanism is located between the legs of the U-shaped body.

8. The dual clutch transmission system according to claim 4, wherein the ring gear body has a U-shaped cross-section, wherein at least part of the first actuating mechanism is located between the legs of the U-shaped body, and wherein the base of the U-shaped body of the ring gear body is provided with at least one opening receiving the actuating finger.

9. The dual clutch transmission system according to claim 1, wherein the rotating assembly comprises a ring gear body, wherein the first actuation mechanism is at least partly located inside the ring gear body, and wherein the biasing mechanism is arranged between ring gear body and the actuating finger.

10. The dual clutch transmission system according to claim 1, wherein the rotating assembly comprises a ring gear body, wherein the first actuation mechanism is at least partly located inside the ring gear body, wherein the actuating plate is located axially with respect to the ring gear body and wherein the actuating plate protrudes in the radial direction form the ring gear body, and wherein the actuating finger extends inside the ring gear body.

11. The dual clutch transmission system according to claim 1, further comprising a hydraulic pump, wherein the pump is arranged to maintain a predetermined non-zero hydraulic pressure in the piston chamber of the base assembly.

12. The dual clutch transmission system according to claim 1, wherein a connecting bolt extends in the piston chamber of the first actuation mechanism.

13. The dual clutch transmission system according to claim 12, wherein the connecting bolt extends through a body of the base assembly for locking a further component to said body.

14. The dual clutch transmission system according to claim 13, wherein a connecting body connects to a locking plate for coupling a bearing mechanism to the body.

15. The dual clutch transmission system according to claim 1, wherein the second torque transmission assembly is arranged in the rotating assembly and is arranged to couple two rotating members in the engaged position and wherein the second actuation mechanism comprises a hydraulic actuation mechanism comprising a piston chamber and a piston for moving the second torque transmission assembly between the disengaged and engaged positions, wherein the second actuation mechanism comprises a biasing mechanism having a biasing force for biasing the second torque transmission assembly towards the disengaged position, wherein the piston chamber of the second actuation mechanism is arranged in the rotating assembly, wherein the system further comprises a controller for controlling the rotational speed of the rotating assembly, wherein the controller is arranged to limit the rotational speed of rotating assembly on the basis of the biasing force of the biasing mechanism; wherein the rotating assembly comprises a transmission coupled to an electric motor, wherein the controller is arranged to limit the rotational speed of the electric motor on the basis of the biasing force of the biasing mechanism, wherein the second torque transmission assembly is arranged to couple between the rotating assembly and an input shaft coupled to a combustion engine, and wherein the rotating assembly has no pressure compensation chamber associated with the piston chamber of the second actuation mechanism.

16. A dual clutch transmission system arranged to be installed in a power train of a motor vehicle for selectively coupling rotating transmission members, the transmission system comprising:

a base assembly;

a rotating assembly which is bearing mounted and rotatable with respect to the base assembly;

first and second torque transmission assemblies being movable between disengaged and engaged positions;

first and second actuation mechanisms associated with the first and second torque transmissions assemblies, wherein the actuation mechanisms are arranged for moving the respective torque transmission assemblies between the disengaged and engaged positions for selectively coupling the transmission members, wherein the first torque transmission assembly is arranged in the rotating assembly and is arranged to couple two rotating members in the engaged position and wherein at least the first actuation mechanism comprises a hydraulic actuation mechanism comprising a piston chamber and a piston for moving the first torque transmission assembly between the disengaged and engaged positions, wherein the piston chamber of the first actuation mechanism is arranged in the base assembly, and wherein the piston is arranged to actuate the first torque transmission assembly in the rotating assembly, wherein the second torque transmission assembly is arranged in the rotating assembly and is arranged to couple two rotating members in the engaged position and wherein the second actuation mechanism comprises a hydraulic actuation mechanism comprising a piston chamber and a piston for moving the second torque transmission assembly between the disengaged and engaged positions, wherein the second actuation mechanism comprises a biasing mechanism having a biasing force for biasing the second torque transmission assembly towards the disengaged position, wherein the piston chamber of the second actuation mechanism is arranged in the rotating assembly, wherein the system further comprises a controller for controlling the rotational speed of the rotating assembly, wherein the controller is arranged to limit the rotational speed of rotating assembly on the basis of the biasing force of the biasing mechanism; wherein the rotating assembly comprises a transmission coupled to an electric motor, wherein the controller is arranged to limit the rotational speed of the electric motor on the basis of the biasing force of the biasing mechanism, wherein the second torque transmission assembly is arranged to couple between the rotating assembly and an input shaft coupled to a combustion engine, and wherein the rotating assembly has no pressure compensation chamber associated with the piston chamber of the second actuation mechanism.

17. A dual clutch transmission system arranged to be installed in a power train of a motor vehicle for selectively coupling rotating transmission members, the transmission system comprising:

a base assembly;

a rotating assembly which is bearing mounted and rotatable with respect to the base assembly;

first and second torque transmission assemblies being movable between disengaged and engaged positions;

first and second actuation mechanisms associated with the first and second torque transmissions assemblies, wherein the actuation mechanisms are arranged for moving the respective torque transmission assemblies between the disengaged and engaged positions for selectively coupling the transmission members, wherein the first torque transmission assembly is arranged in the rotating assembly and is arranged to couple two rotating members in the engaged position and wherein at least the first actuation mechanism comprises a hydraulic actuation mechanism comprising a piston chamber and a piston for moving the first torque transmission assembly between the disengaged and engaged positions, wherein the piston chamber of the first actuation mechanism is arranged in the base assembly, wherein the piston is arranged to actuate the first torque transmission assembly in the rotating assembly, wherein the first actuation mechanism comprises a biasing mechanism for biasing the first torque transmission assembly towards the disengaged position, wherein the first actuation mechanism comprises an actuating member which is axially movable to move the first torque transmission assembly between the disengaged and engaged positions, and wherein the biasing mechanism is arranged between the actuating member and a body of the rotating assembly, wherein the actuating member comprises a radially extending actuating plate and at least one actuating finger extending perpendicular from the actuating plate, wherein the biasing member is coupled to the actuating finger, wherein a connecting bolt extends in the piston chamber of the first actuation mechanism, and wherein the connecting bolt extends through a body of the base assembly for locking a further component to said body.

18. The dual clutch transmission system according to claim 17, wherein a connecting body connects to a locking plate for coupling a bearing mechanism to the body.

* * * * *